UNSYMMETRICAL CONDUCTOR ARRANGEMENTS

Original Filed July 29, 1953

Inventors
WERNER KOCH
HANS-ULRICH HARTEN
BY Toulmin & Toulmin
ATTORNEYS

United States Patent Office

Re. 24,537

Reissued Sept. 23, 1958

24,537

UNSYMMETRICAL CONDUCTOR ARRANGEMENTS

Werner Koch and Hans-Ulrich Harten, Belecke, Mohne, Germany, assignors to Licentia Patent-Verwaltungs-G. m. b. H., Hamburg, Germany Original No. 2,703,855, dated March 8, 1955, Serial No. 371,002, July 29, 1953. Application for reissue September 27, 1957, Serial No. 689,251

10 Claims. (Cl. 317—234)

Matter enclosed in heavy brackets [ ] appears in the original patent but forms no part of this reissue specification; matter printed in italics indicates the additions made by reissue.

The present invention relates to arrangements for electrical unsymmetrical conductors, and more particularly to unsymmetrical conductor systems which provide for cooling thereof.

The usual systems and arrangements for cooling electrical unsymmetrical conductive systems relate as a rule only to rectifiers for rectifying high currents for which a corresponding heat development was to be expected. The solution to this problem was favored by the fact that the semiconductor substances so far used for rectifiers of high load were those which permitted a proportionally low current per unit area of the rectifier so that the rectifier could be designed for a certain heat capacity. The semiconductors which permitted a relatively high current intensity were hitherto applied only to rectifier constructions of relatively low current load, such as crystal diodes or transistors. In addition thereto, the high heat conductivity of these semiconductors prevented an accumulation of heat and therefore there was no necessity for cooling of systems of this type. Lately, however, systems with high load semiconductors have been built which permitted the rectification and control of high currents and which developed great heat in relatively small space.

It is therefore an object of the present invention to provide [an electrical unsymmetrical conductive system arrangement which provides for cooling of the arrangement even with high current per unit area.] *a cooling arrangement for electrical unsymmetrically conductive systems which are capable of carrying high current loads comprising means for cooling said system.*

It is another object of the present invention to provide an arrangement for cooling of unsymmetrical conductor systems in which the unsymmetrical conductor is arranged in a container which provides for a desired cooling of the arrangement.

It is still another object of the present invention to provide for the cooling of electrical unsymmetrical conductive arrangements with or without the provision of a cooling fluid.

Other objects and advantages of the present invention will be apparent from a further reading of the specification and of the appended claims.

With the above objects in view, the present invention mainly comprises [an arrangement for electrical unsymmetrical conductive systems, comprising in combination, a crystalline semiconductor body having a blocking layer zone adjacent a face thereof, an electrode contacting the crystalline semiconductor body on a surface portion other than the face, and a thermally conductive body in contact with the face thereof in such manner that the semiconductor body is in greater thermal contact with the thermally conductive body on the face of the semiconductive body having the blocking layer than on any other surface portion of the semiconductor body so that heat formed at the blocking layer is conducted away from the semiconductor body to a greater extent than heat formed at any other portion of the semiconductor body, thereby cooling the semi conductor body.] *a cooling arrangement for electrical unsymmetrically conductive systems, comprising, in combination, a crystalline semiconductor body of alloyable semiconductive material, and having a blocking layer zone adjacent a face thereof; at least one electrode contacting said semiconductor body on a surface portion thereof other than said face; and a thermally conductive body fusedly connected to said face of said semiconductor body, and serving as the heat dissipating element for at least that portion of said semiconductor body which comprises said face and blocking layer zone.*

The present invention is concerned with an arrangement for the cooling of electrical unsymmetrical conductive systems with semiconductive material which permits a high capacity or load per unit area, e. g., germanium or silicon, especially for surface rectifiers or crystal amplifiers, wherein the surface portion of the crystal adjacent the blocking layer of the crystal [is in better heat contact with the cooling portion than is any other portion of the crystal.] *is in contact with cooling means, comprising a thermally conductive body fusedly connected to said surface portion, and serving as the heat dissipating element for at least that portion of the semiconductor body which comprises said surface and blocking layer zone.* By this arrangement it is assumed that the blocking layer where the greater part of the heat is developed has particularly favorable cooling conditions so that heat accumulation is prevented.

It is further advantageous to either partially or completely enclose the conductive system in a container, wherein the heat drawn off is transferred to a cooling medium through radiation, convection or heat conduction. The container can be either double-walled with a cooling agent contained between the walls or flowing through between the walls, and/or the exterior of the container can be exposed to a cooling agent. As cooling agents, air, water or oil may be advantageously used.

Besides the cooling action, the container also protects the system from mechanical damage and from the disturbing influence of alternating fields as well as from light falling thereon with the additional undesirable photoelectric effects which can be produced thereby. This protection, as well as the cooling, can be further improved by filling up the container with a casting resin so that the cast mass completely envelops the semiconductive body on its free side. It is advantageous to utilize a casting resin which shrinks upon hardening to an extent of less than 1%. It is, further, preferable to utilize a casting resin having a high heat conductivity. For this purpose it is especially suitable to utilize a casting resin which contains powdered quartz as a filler.

[In general, it is of advantage to secure the system to the inner wall of the container in such manner that the surface portion of the crystal adjacent the blocking layer is in metallic thermal contact with the cooling portion of the system. Thereby under certain circumstances it is additionally advantageous that the system be electrically connected with the cooling parts, it being particularly advantageous to make the contact between the system and the cooling parts free of blocking layers. This is best done by soldering to the cooling portion the electrode located on the surface portion of the crystal closest to the blocking layer. A variation of this could consist in the cooling portion serving also as the electrode.]

*In general, it is of advantage to secure the semiconductive system to the inner wall of the container. This is preferably done in such a manner that the surface por-*

*tions of the crystal nearest to the blocking layer are in metallic thermal contact with the cooling portions of the container. This kind of thermal contact offers the additional advantage that the system is electrically connected with the cooling parts of the container, and that, to a practical degree, such metallic thermal contact is free from blocking layers. This metallic thermal contact is best established by soldering on to the cooling portions of the container the thermally conductive body located on the face of the crystal closest to the blocking layer, which thermally conductive body may serve as an electrode, and is thus capable of compensating differences in stresses occurring between the cooling portions of the container and the semiconductive body. According to a different embodiment of this particular feature of the invention, the surface portion of the crystal adjacent the blocking layer is fastened on the aforesaid cooling portion of the container by means of an intermediate layer of soldering material, in which case the cooling portion itself serves as an electrode.*

The connection between the crystal and the [cooling portion] *thermally conductive element of the cooling arrangement* is best produced by fusing the parts together. It is of particular advantage if the cooling [portion] *element* at the fused connection with the crystal is composed partially or entirely of a material which by diffusion into the crystal materially influences the conductivity of the crystal, as when an n-type crystal is joined to a cooling part which is composed entirely or partially of a material which by diffusion into the crystal produces p-type conductivity characteristics. In the use of a crystal composed of n-type germanium, aluminum, thallium, indium and gallium are particularly suitable, while the largest part of the cooling portion is advantageously composed of aluminum. If the crystal has p-type conductivity characteristics, then the cooling portion is selected to have a composition entirely or partially of a material which by diffusion into the crystal produces n-type conductivity characteristics, as when a crystal of p-type germanium is used with a cooling portion composed entirely or partially of antimony or tin.

*The cooling element and the semiconductor body are fused together at the face of the semiconductor body adjacent the blocking layer preferably by using an intermediate layer of a material alloyable with both the semiconductor body and the cooling element. The intermediate layer may be of one of the above mentioned materials.*

Care should be taken that the cooling [portion] *element* at the fused surfaces contains no impurities which might unfavorably influence the distribution of disturbance centers in the crystal.

The fusion of the cooling [portion] *part* with the crystal is best carried out under reduced pressure or preferably in the presence of an inert protective gas. The crystal together with the cooling [portion] *part* may be subjected to heat treatment during or after the fusing step in order to obtain the desired distribution of disturbance centers in the crystal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
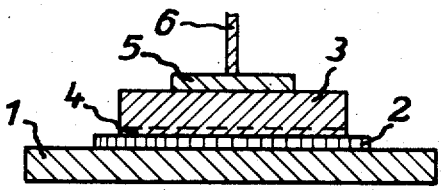
Fig. 1 is a schematic view of an embodiment of an electrical unsymmetrical conductive system having a cooling arrangement in accordance with the present invention.

Referring now to the drawings, and particularly to Fig. 1 a base plate 1 of copper is shown, on which is secured a layer of indium 2, and on the surface of the indium layer 2 an n-conductive germanium block 3 is placed, the germanium block 3 containing substances forming disturbance centers, as for example, antimony. The lower portion 4 of the germanium block is of p-type conductivity due to the diffusion of indium therein, so that a blocking layer is formed substantially at the level indicated by the interrupted line shown in Fig. 1. An electrode 5, which is as free of blocking layers as possible, is arranged on top of the germanium block 3, electrode 5 being composed, for example, of tin, the electrode being connected to a conductor lead 6.

Figure 2:
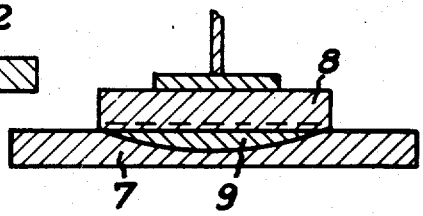
Fig. 2 shows another embodiment of the present invention.

In Fig. 2, there is shown a base plate 7 composed of aluminum on which a layer 9 if indium has been deposited by evaporation, and a germanium block 8 arranged on the indium layer. This assembly is heated to the fusing temperature of the aluminum-indium layers, and as a result the lower part of germanium block 8 becomes p-conductive while the remaining portion of the germanium block and the counterelectrode composed of tin at the other surface of the germanium block remain n-conductive.

Figure 3:
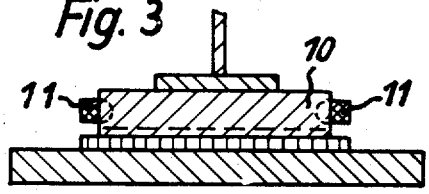
Figure 3 shows still another embodiment of the present invention.

Fig. 3 shows substantially the same system as illustrated in Fig. 1 except that in the Fig. 3 arrangement the germanium block 10 above the zone of the blocking layer, which is indicated by an interrupted line, is provided with control electrodes 11, which are *preferably* connected to surface areas of the n-conductive germanium block which are p-conductive due to, for example, thermal transformation *which p-conductive surface areas beneath the electrodes 11 must be separate from the p-conductive face and the blocking layer of the block 10 next adjacent the thermally conductive body. These p-conductive surface areas beneath the control electrodes 11 do not require special cooling means since the heat developed in those areas during operation is negligible.*

Figure 4:
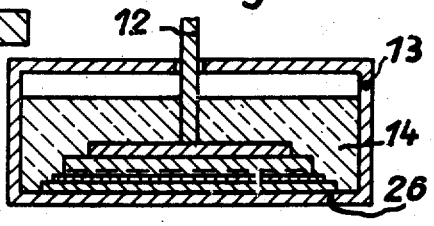
Fig. 4 shows a system similar to that shown in Fig. 1 and provided with a container.

In Fig. 4 is shown a system generally indicated by which is similar to that shown in Fig. 1, the system being soldered as shown by layer 26 to a container 13, the interior of the container being partially filled with a casting resin 14 covering the system 12. In this embodiment, the system 12 is connected electrically and thermally with the container 13, and the container 13 serves as a lead conductor.

Figure 5:
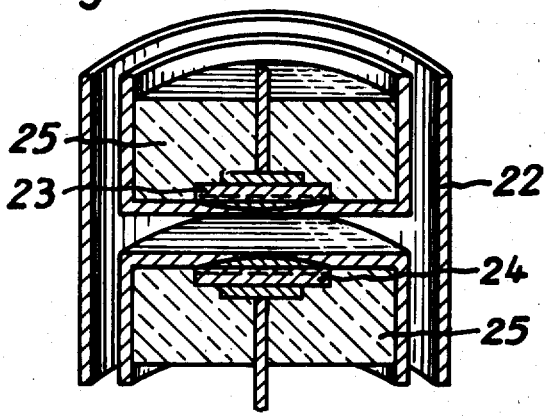
Fig. 5 shows a pair of conductor systems similar to that shown in Fig. 2 and including still another form of container.

In Fig. 5 there is shown an H-shaped cylinder 22, which is composed, for example, of aluminum, the cylinder 22 being so formed that a cooling fluid may pass therethrough. Two systems 23 and 24, each of which corresponds to the system shown in Fig. 2, are so arranged in aluminum cylinder 22 that the cylinder serves directly as an electrode. In this embodiment also, the systems are covered by casting resin 25.

Other arrangements in addition to those described above may be provided in accordance with the teaching of the present invention. In general, a construction according to the teaching of the invention is particularly suitable for use as a surface rectifier or crystal amplifier.

It will be understood that each of the elements described above, or two or more together, may also find a useful application in other types of conductive systems differing from the types described above.

While the invention has been illustrated and described as embodied in electrical unsymmetrical conductive systems, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

It should be understood that the description of the property of elements mentioned herein as being "free of blocking layers" is intended to refer to the fact that substantially no blocking layer is present between such elements and the semiconductor body.

What is claimed as new and desired to be secured by Letters Patent is:

[1. Arrangement for electrical unsymmetrical conductive systems, comprising, in combination, a crystalline semiconductor body having a blocking layer zone adjacent a face thereof; an electrode contacting said crystalline semiconductor body on a surface portion other than said face; and a thermally conductive body fused to and in contact with said face thereof in such manner that said semiconductor body is in greater thermal contact with said thermally conductive body on the face of said semiconductor body having said blocking layer than on any other surface portion of said semiconductor body so that heat formed at said blocking layer is conducted away from said semiconductor body to a greater extent than heat formed at any other portion of said semiconductor body, thereby cooling said semiconductor body, said thermally conductive body being at least partially composed of material which by diffusion into said crystalline semiconductor body influences the conductivity thereof.]

[2. Arrangement for electrical unsymmetrical conductive systems, comprising, in combination, a crystalline semiconductor body having n-type conductive characteristics and having a blocking layer zone adjacent a face thereof; an electrode contacting said crystalline semiconductor body on a surface portion other than said face; and a thermally conductive body fused to and in contact with said face thereof in such manner that said semiconductor body is in greater thermal contact with said thermally conductive body on the face of said semiconductor body having said blocking layer than on any other surface portion of said semiconductor body so that heat formed at said blocking layer is conducted away from said semiconductor body to a greater extent than heat formed at any other portion of said semiconductor body, thereby cooling said semiconductor body, said thermally conductive body being at least partially composed of material which by diffusion into said crystalline semiconductor body produces p-type conductive characteristics therein.]

[3. Arrangement for electrical unsymmetrical conductive systems, comprising, in combination, a crystalline semiconductor body composed of germanium having n-type conductive characteristics and having a blocking layer zone adjacent a face thereof; an electrode contacting said crystalline semiconductor body on a surface portion other than said face; and a thermally conductive body fused to and in contact with said face thereof in such manner that said semiconductor body is in greater thermal contact with said thermally conductive body on the face of said semiconductor body having said blocking layer than on any other surface portion of said semiconductor body so that heat formed at said blocking layer is conducted away from said semiconductor body to a greater extent than heat formed at any other portion of said semiconductor body, thereby cooling said semiconductor body, said thermally conductive body being at least partially composed of material which by diffusion into said crystalline semiconductor body produces p-type conductive characteristics therein.]

[4. Arrangement for electrical unsymmetrical conductive systems, comprising, in combination, a crystalline semiconductor body having n-type conductive characteristics and having a blocking layer zone adjacent a face thereof; an electrode contacting said crystalline semiconductor body on a surface portion other than said face; and a thermally conductive body fused to and in contact with said face thereof in such manner that said semiconductor body is in greater thermal contact with said thermally conductive body on the face of said semiconductor body having said blocking layer than on any other surface portion of said semiconductor body so that heat formed at said blocking layer is conducted away from said semiconductor body to a greater extent than heat formed at any other portion of said semiconductor body, thereby cooling said semiconductor body, said thermally conductive body being at least partially composed of a substance selected from the group consisting of aluminum, thallium, indium, and gallium which by diffusion into said crystalline semiconductor body produces p-type conductive characteristics therein.]

[5. Arrangement for electrical unsymmetrical conductive systems, comprising, in combination, a crystalline semiconductor body having a blocking layer zone adjacent a face thereof; an electrode contacting said crystalline semiconductor body on a surface portion other than said face; and a thermally conductive body fused to and in contact with said face thereof in such manner that said semiconductor body is in greater thermal contact with said thermally conductive body on the face of said semiconductor body having said blocking layer than on any other surface portion of said semiconductor body so that heat formed at said blocking layer is conducted away from said semiconductor body to a greater extent than heat formed at any other portion of said semiconductor body, thereby cooling said semiconductor body, said thermally conductive body mainly comprising aluminum which by diffusion into said crystalline semiconductor body influences the conductivity thereof.]

[6. Arrangement for electrical unsymmetrical conductive systems, comprising, in combination, a crystalline semiconductor body having p-type conductive characteristics and having a blocking layer zone adjacent a face thereof; an electrode contacting said crystalline semiconductor body on a surface portion other than said face; and a thermally conductive body fused to and in contact with said face thereof in such manner that said semiconductor body is in greater thermal contact with said thermally conductive body on the face of said semiconductor body having said blocking layer than on any other surface portion of said semiconductor body so that heat formed at said blocking layer is conducted away from said semiconductor body to a greater extent than heat formed at any other portion of said semiconductor body, thereby cooling said semiconductor body, said thermally conductive body being at least partially composed of material which by diffusion into said crystalline semiconductor body produces n-type conductive characteristics therein.]

[7. Arrangement for electrical unsymmetrical conductive systems, comprising, in combination, a crystalline semiconductor body composed of germanium having p-type conductive characteristics and having a blocking layer zone adjacent a face thereof; an electrode contacting said crystalline semiconductor body on a surface portion other than said face; and a thermally conductive body fused to and in contact with said face thereof in such manner that said semiconductor body is in greater thermal contact with said thermally conductive body on the face of said semiconductor body having said blocking layer than on any other surface portion of said semiconductor body so that heat formed at said blocking layer is conducted away from said semiconductor body to a greater extent than heat formed at any other portion of said semiconductor body, thereby cooling said semiconductor body, said thermally conductive body being at least partially composed of material which by diffusion into said crystalline semiconductor body produces n-type conductive characteristics therein.]

[8. Arrangement for electrical unsymmetrical conductive systems, comprising, in combination, a crystalline semiconductor body having p-type conductive characteristics and having a blocking layer zone adjacent a face thereof; an electrode contacting said crystalline semiconductor body on a surface portion other than said face; and a thermally conductive body fused to and in contact with said face thereof in such manner that said semiconductor body is in greater thermal contact with said thermally conductive body on the face of said semiconductor body having said blocking layer than on any other surface portion of said semiconductor body so that heat formed at said blocking layer is conducted away from said semiconductor body to a greater extent than heat formed at any other portion of said semiconductor body, thereby cooling said semiconductor body, said thermally conductive body being at least partially composed of a metal selected from the group consisting of antimony and tin which by diffusion into said crystalline semiconductor body produces n-type conductive characteristics therein.]

[9. Arrangement for electrical unsymmetrical conductive systems, comprising, in combination, a crystalline semiconductor body having a blocking layer zone adjacent a face thereof; an electrode contacting said crystalline semiconductor body on a surface portion other than said face; and a thermally conductive body fused to and in contact with said face thereof in such manner that said semiconductor body is in greater thermal contact with said thermally conductive body on the face of said semiconductor body having said blocking layer than on any other surface portion of said semiconductor body so that heat formed at said blocking layer is conducted away from said semiconductor body to a greater extent than heat formed at any other portion of said semiconductor body, thereby cooling said semiconductor body, the portion of said thermally conductive body fused to said semiconductive body being free of impurities which unfavorably influence the distribution of disturbance centers in said semiconductor body.]

*10. A cooling arrangement for electrical unsymmetrically conductive systems, comprising, in combination, a crystalline semiconductor body of alloyable semiconductive material, and having a blocking layer zone adjacent a face thereof; at least one electrode contacting said semiconductor body on a surface portion thereof other than said face; and a thermally conductive body fusedly connected to said face of said semiconductor body, and serving as the heat dissipating element for at least that portion of said semiconductor body which comprises said face and blocking layer zone.*

*11. A cooling arrangement for electrical unsymmetrically conductive systems, comprising, in combination, a crystalline semiconductor body of alloyable semiconductive material, having n-type conductive characteristics and capable of carrying high current loads, and having a blocking layer zone adjacent a face thereof; at least one electrode contacting said semiconductor body on a surface portion thereof other than said face; and a thermally conductive body fusedly connected to said face of said semiconductor body, and serving as the heat dissipating element for at least that portion of said semiconductor body which comprises said face and blocking layer zone, said thermally conductive body being at least partially composed of material which by diffusion into said crystalline semiconductor body produces p-type conductive characteristics therein.*

*12. A cooling arrangement for electrical unsymmetrically conductive systems, comprising, in combination, a crystalline semiconductor body composed of germanium having n-type conductive characteristics of alloyable semiconductive material, and having a blocking layer zone adjacent a face thereof; at least one electrode contacting said semiconductor body on a surface portion thereof other than said face; and a thermally conductive body fusedly connected to said face of said semiconductor body, and serving as the heat dissipating element for at least that portion of said semiconductor body which comprises said face and blocking layer zone, said thermally conductive body being at least partially composed of material which by diffusion into said crystalline semiconductor body produces p-type conductive characteristics therein.*

*13. A cooling arrangement for electrical unsymmetrically conductive systems, comprising, in combination, a crystalline semiconductor body of alloyable semiconductive material, having n-type conductive characteristics and capable of carrying high current loads, and having a blocking layer zone adjacent a face thereof; at least one electrode contacting said semiconductor body on a surface portion thereof other than said face; and a thermally conductive body fusedly connected to said face of said semiconductor body, and serving as the heat dissipating element for at least that portion of said semiconductor body which comprises said face and blocking layer zone, said thermally conductive body being at least partially composed of a substance selected from the group consisting of aluminum, thallium, indium, and gallium which by diffusion into said crystalline semiconductor body produces p-type conductive characteristics therein.*

*14. A cooling arrangement for electrical unsymmetrically conductive systems, comprising, in combination, a crystalline semiconductor body of alloyable semiconductive material, and capable of carrying high current loads, and having a blocking layer zone adjacent a face thereof; at least one electrode contacting said semiconductor body on a surface portion thereof other than said face; and a thermally conductive body fusedly connected to said face of said semi-conductor body, and serving as the heat dissipating element for at least that portion of said semiconductor body which comprises said face and blocking layer zone, said thermally conductive body mainly comprising aluminum which by diffusion into said crystalline semiconductor body influences the conductivity thereof.*

*15. A cooling arrangement for electrical unsymmetrically conductive systems, comprising, in combination, a crystalline semiconductor body of alloyable semiconductive material, having p-type conductive characteristics and capable of carrying high current loads, and having a blocking layer zone adjacent a face thereof; at least one electrode contacting said semiconductor body on a surface portion thereof other than said face; and a thermally conductive body fusedly connected to said face of said semiconductor body, and serving as the heat dissipating element for at least that portion of said semiconductor body which comprises said face and blocking layer zone, said thermally conductive body being at least partially composed of material which by diffusion into said crystalline semiconductor body produces n-type conductive characteristics therein.*

*16. A cooling arrangement for electrical unsymmetrically conductive systems, comprising, in combination, a crystalline semiconductor body composed of germanium having p-type characteristics of alloyable semiconductive material, and having a blocking layer zone adjacent a face thereof; at least one electrode contacting said semiconductor body on a surface portion thereof other than said face; and a thermally conductive body fusedly connected to said face of said semiconductor body, and serving as the heat dissipating element for at least that portion of said semiconductor body which comprises said face and blocking layer zone, said thermally conductive body being at least partially composed of material which by diffusion into said crystalline semiconductor body produces n-type conductive characteristics therein.*

*17. A cooling arrangement for electrical unsymmetri-*

*cally conductive systems, comprising, in combination, a crystalline semiconductor body of alloyable semiconductive material, having p-type conductive characteristics and capable of carrying high current loads, and having a blocking layer zone adjacent a face thereof; at least one electrode contacting said semi-conductor body on a surface portion thereof other than said face; and a thermally conductive body fusedly connected to said face of said semiconductor body, and serving as the heat dissipating element for at least that portion of said semiconductor body which comprises said face and blocking layer zone, said thermally conductive body being at least partially composed of a metal selected from the group consisting of antimony and tin which by diffusion into said crystalline semiconductor body produces n-type conductive characteristics therein.*

*18. A cooling arrangement for electrical unsymmetrically conductive systems, comprising, in combination, a crystalline semiconductor body of alloyable semiconductive material, and capable of carrying high current loads, and having a blocking layer zone adjacent a face thereof; at least one electrode contacting said semiconductor body on a surface portion thereof other than said face; and a thermally conductive body fusedly connected to said face of said semiconductor body, and serving as the heat dissipating element for at least that portion of said semiconductor body which comprises said face and blocking layer zone, the portion of said thermally conductive body fused to said semiconductive body being free of impurities which unfavorably influence the distribution of disturbance centers in said semiconductor body.*

*19. A cooling arrangement for electrical unsymmetrically conductive systems, comprising, in combination, a crystalline semiconductor body of alloyable semiconductive material and having a blocking layer zone adjacent a face thereof; at least one electrode contacting said semiconductor body on a surface portion thereof other than said face; a thermally conductive body and an intermediate layer, of a material alloyable with both said semiconductor body and said thermally conductive body, said thermally conductive body being fusedly connected to said face of said semiconductor body through said intermediate layer, said thermally conductive body serving as the heat dissipating element for at least that portion of said semiconductor body which comprises said face and blocking layer zone.*

References Cited in the file of this patent or the original patent

UNITED STATES PATENTS

| | | |
|---|---|---|
| 1,728,537 | Geiger | Sept. 17, 1929 |
| 1,750,123 | Peter | Mar. 11, 1930 |
| 2,501,331 | Hein | Mar. 21, 1950 |
| 2,504,627 | Benzer | Apr. 18, 1950 |
| 2,510,092 | Escoffery et al. | June 6, 1950 |
| 2,560,594 | Pearson | July 17, 1951 |
| 2,561,411 | Pfann | July 24, 1951 |
| 2,569,347 | Shockley | Sept. 25, 1951 |
| 2,644,852 | Dunlap | July 7, 1953 |
| 2,725,505 | Webster et al. | Nov. 29, 1955 |
| 2,730,663 | Harty | Jan. 10, 1956 |
| 2,735,050 | Armstrong | Feb. 14, 1956 |
| 2,751,528 | Burton | June 19, 1956 |
| 2,752,541 | Losco | June 26, 1956 |
| 2,754,455 | Pankove | July 10, 1956 |
| 2,759,133 | Mueller | Aug. 14, 1956 |
| 2,763,822 | Frola et al. | Sept. 18, 1956 |